United States Patent
Hsu et al.

(10) Patent No.: US 9,915,981 B2
(45) Date of Patent: Mar. 13, 2018

(54) HINGE DEVICE APPLICABLE TO SOFT DISPLAY MODULE

(71) Applicant: FIRST DOME CORPORATION, New Taipei (TW)

(72) Inventors: An Szu Hsu, New Taipei (TW); Yang Zhong Wu, Shenzhen (CN)

(73) Assignee: First Dome Corporation, New Taipei (TW)

( * ) Notice: Subject to any disclaimer, the term of this patent is extended or adjusted under 35 U.S.C. 154(b) by 147 days.

(21) Appl. No.: 14/886,194

(22) Filed: Oct. 19, 2015

(65) Prior Publication Data
US 2016/0370828 A1   Dec. 22, 2016

(30) Foreign Application Priority Data

Jun. 17, 2015 (TW) .............................. 104209713 U
Aug. 25, 2015 (TW) .............................. 104127617 A

(51) Int. Cl.
G06F 1/16 (2006.01)

(52) U.S. Cl.
CPC .......... G06F 1/1681 (2013.01); G06F 1/1652 (2013.01); *Y10T 16/5474* (2015.01)

(58) Field of Classification Search
CPC ....... E05D 11/1028; E05D 3/06; E05D 3/122; E05D 7/00; H05K 5/0017; H05K 5/0226; G06F 1/1681; G06F 1/1652; H04M 1/022; F16M 11/10; E05Y 2900/606; Y10T 16/541; Y10T 16/547; Y10T 16/5474; Y10T 16/5475; Y10T 16/5476

USPC .......... 16/354, 366, 368, 369, 370; 248/919; 379/433.13; 455/575.3; 361/679.27, 361/679.06

See application file for complete search history.

(56) References Cited

U.S. PATENT DOCUMENTS

| | | | |
|---|---|---|---|
| 6,223,393 B1 * | 5/2001 | Knopf ................... | G06F 1/1618 16/366 |
| 8,720,011 B1 * | 5/2014 | Hsu ........................ | E05D 3/122 16/354 |
| 8,971,032 B2 * | 3/2015 | Griffin .................. | G06F 1/1616 345/156 |
| 9,506,279 B2 * | 11/2016 | Kauhaniemi ......... | G06F 1/1652 |
| 9,562,380 B2 * | 2/2017 | Song | |
| 9,606,583 B2 * | 3/2017 | Ahn ....................... | G06F 1/1681 |
| 2014/0123436 A1 * | 5/2014 | Griffin ................ | H04M 1/0216 16/221 |

(Continued)

*Primary Examiner* — William Miller
(74) *Attorney, Agent, or Firm* — Rosenberg, Klein & Lee

(57) ABSTRACT

A hinge device applicable to soft display module includes a joint unit assembly. The joint unit assembly has a main section, a first side, a second side and a top section. The joint unit assembly has multiple shaft guide sections and shaft fixing sections positioned on the main section and respectively assembled with the motional shafts. A rotary shaft and a socket are formed on the first and second sides of the joint unit assembly along the top section. A (soft) display module is disposed on the top section of the joint unit assembly. The shaft guide section of the joint unit assembly is defined with a first position and a second position. When operating and opening/closing the display module, the rotary shafts serve as rotational fulcrums, whereby the motional shafts are relatively rotatable between the first and second positions of the shaft guide section.

27 Claims, 5 Drawing Sheets

(56) References Cited

U.S. PATENT DOCUMENTS

| | | | |
|---|---|---|---|
| 2015/0277506 A1* | 10/2015 | Cheah | G06F 1/1681 361/679.27 |
| 2016/0048174 A1* | 2/2016 | Hsu | G06F 1/1681 16/342 |
| 2016/0139634 A1* | 5/2016 | Cho | G06F 1/1652 361/679.27 |
| 2016/0147267 A1* | 5/2016 | Campbell | G06F 1/1681 361/679.27 |
| 2016/0202736 A1* | 7/2016 | Huang | G06F 1/1681 16/369 |
| 2016/0370829 A1* | 12/2016 | Hsu | G06F 1/1681 |
| 2017/0060188 A1* | 3/2017 | Han | G06F 1/1652 |
| 2017/0061836 A1* | 3/2017 | Kim | G09F 9/301 |

\* cited by examiner

HINGE DEVICE APPLICABLE TO SOFT DISPLAY MODULE

BACKGROUND OF THE INVENTION

1. Field of the Invention

The present invention relates generally to a hinge device applicable to soft display module, and more particularly to a hinge device assembled with an electronic apparatus. The hinge device includes a joint unit assembly having rotary shafts and motional shafts in adaptation to the operation of the electronic apparatus for moving the joint unit assembly.

2. Description of the Related Art

There are various electronic apparatuses provided with covers or display screens, such as mobile phones, notebooks, PDA, digital image capturing devices and electronic books. The covers, display screens or viewers are pivotally mounted on the electronic apparatuses via pivot pins or rotary shafts, whereby the covers or display screens can be freely rotated and opened/closed under external force.

In order to operate the display module (such as the screen) and/or the apparatus body module of the electronic apparatus in more operation modes and application ranges, a conventional dual-shaft mechanism mounted between the display module and the apparatus body module has been developed to rotate the display module and/or the apparatus body module by different angles in accordance with different operation modes. For example, U.S. Pat. No. 7,512,426 B2 discloses a mobile communications device with synchronizing hinge.

With respect to the operation, motion and structural design of these pivot pins or hinge devices, the conventional pivot pin device cannot be mounted on a flexible soft display screen or display module in adaptation to the flexion and rotation of the soft screen. This is because:

1. In the case that the conventional pivot pin device or rotary shaft is applied to a flexible soft display screen, the rotary shaft will be relatively positioned on outer face (or outer end face) of the display screen, while the display screen is relatively positioned on the inner (end) face of the rotary shaft. There is a certain distance between the display screen and the axis of the rotary shaft. Therefore, when the display screen is flexed with the axis of the rotary shaft positioned on relative outer end serving as the rotational fulcrum, the display screen on the inner face of the rotary shaft will be squeezed and crimped. This is not what we expect.
2. When the existent rotary shaft or pivot pin device is applied to a flexible soft display screen, the soft display screen cannot be immediately truly located after flexed or opened/closed.

The conventional rotary shaft and the relevant connection components thereof have some shortcomings in use and structural design that need to be overcome. It is therefore tried by the applicant to provide a hinge device applicable to soft display module to change the use form, widen the application range and facilitate the operation of the conventional rotary shaft and thus eliminate the shortcomings existing in the conventional rotary shaft. Especially, the hinge device is applicable to an electronic apparatus with soft display screen or display module in condition of simple structural design and simple operation of the hinge device, rotary shaft or the relevant connection components to solve the problems of the conventional rotary shaft (that when the display screen is flexed or rotated around the rotary shaft, the display screen will be squeezed and crimped and the soft display screen cannot be truly located). Also, a frictional torque system and/or torque mechanism is further provided to enhance the locating or fixing effect of the hinge device in operation. Moreover, according to the specification, the number or torque of the hinge device and/or torque mechanism can be easily changed or adjusted to meet the pattern design requirement of lightweight and slim configuration of electronic apparatus.

SUMMARY OF THE INVENTION

It is therefore a primary object of the present invention to provide a hinge device applicable to soft display module. The hinge device includes a joint unit assembly defined with or provided with multiple rotary shafts and multiple motional shafts. The joint unit assembly is defined with or has a main section (or referred to as middle section). The main section has two ends, a first side, a second side and a top section positioned on upper side of the main section. The rotary shafts are positioned on the top section and/or an edge section of the joint unit assembly. The motional shafts are positioned on the main section of the joint unit assembly. The joint unit assembly is movable with the rotary shafts serving as rotational fulcrums to drive the motional shafts to relatively displace and move within the main section of the joint unit assembly.

In a preferred embodiment, the hinge device is an assembly of a joint unit assembly with rotary shafts and multiple motional shafts. The joint unit assembly has a shaft fixing section (or referred to as shaft fixing portion) and a shaft guide section (or referred to as shaft guide portion) positioned on the main section and respectively assembled with the motional shafts. A rotary shaft and a corresponding socket are respectively formed on the first and second sides of the joint unit assembly along the top section. A (soft) display module is disposed on the top sections of the joint unit assembly. The shaft guide section of the joint unit assembly is defined with a first position and a second position. When a user operates and opens/closes the display module, the joint unit assembly is rotated with the rotary shaft and the socket of the joint unit assembly serving as rotational fulcrums, whereby the motional shafts are rotatably relatively movable between the first and second positions of the shaft guide section to flex and open/close the display module.

In the above hinge device applicable to soft display module, the joint unit assembly includes multiple joint units. The joint unit has a protrusion for assembling with a recess of an adjacent joint unit. When the joint units are rotated along with the opening/closing of the display module, the protrusion and the recess move relative to each other to establish a frictional torque system.

In the above hinge device applicable to soft display module, the joint unit assembly includes a first joint unit, a second joint unit and at least one subsidiary joint unit. Each of the first, second and subsidiary joint units is defined with two sides and two ends. Two sides of the joint units are respectively formed with rotary shafts and sockets. Two ends of the first and second joint units are respectively pivotal ends and assembling ends. A shaft guide section and a recess are disposed at or near the pivotal end of the first joint unit. A shaft fixing section and a protrusion are disposed at or near the pivotal end of the second joint unit.

In the above hinge device applicable to soft display module, a rotary shaft and a socket are formed on the top section or an edge section of two sides of the subsidiary joint unit. The rotary shafts of the forward and backward subsidiary joint units are inserted in the sockets of the adjacent subsidiary joint units, permitting the rotary shafts to freely rotate within the sockets. Protrusions, shaft fixing sections, recesses and shaft guide sections are disposed at or near two ends of the subsidiary joint units. The protrusions of the leftward and rightward subsidiary joint units are assembled with the recesses of the adjacent subsidiary joint units. Multiple motional shafts are assembled with the shaft guide section of the first joint unit, the shaft guide section (and/or shaft fixing section) of the subsidiary joint unit and the shaft fixing section of the second joint unit. When the display module is flexed and opened/closed, under the effect of torque change, the first, second and subsidiary joint units can be rotated with the rotary shafts serving as the rotational fulcrums. At the same time, the motional shafts are rotatably relatively moved between the first and second positions of the shaft guide section to open/close the display module.

In the above hinge device applicable to soft display module, the motional shafts are assembled with a torque mechanism. The torque mechanism includes a first torque unit, a second torque unit and at least one subsidiary torque unit respectively corresponding to the first, second and subsidiary joint units. When the motional shafts move, the torque mechanism frictionally interferes with the motional shafts to create torque change or torque difference.

The present invention can be best understood through the following description and accompanying drawings, wherein:

DETAILED DESCRIPTION OF THE PREFERRED EMBODIMENTS

Figure 1:
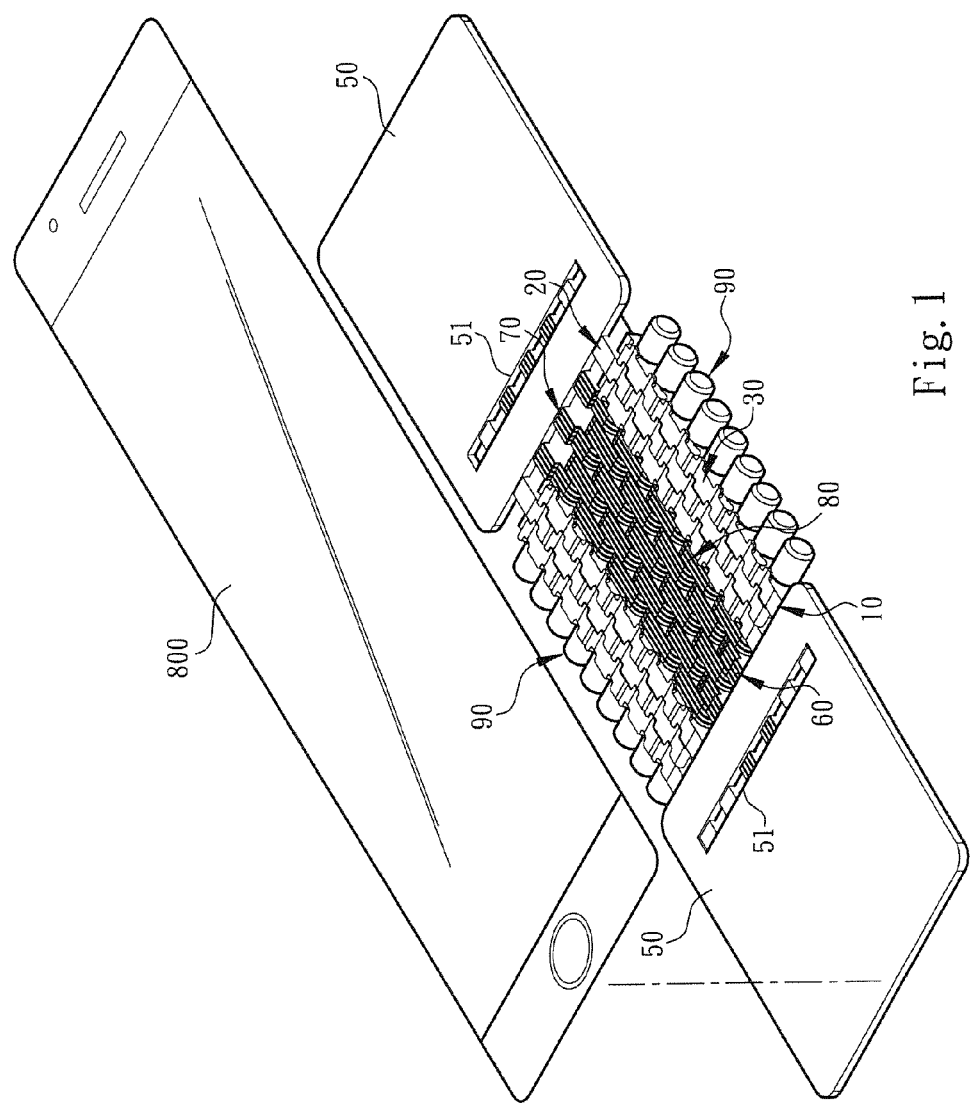
FIG. 1 is a perspective view of a preferred embodiment of the hinge device of the present invention, showing that a soft display screen or display module is disposed on the hinge device.
Figure 2:
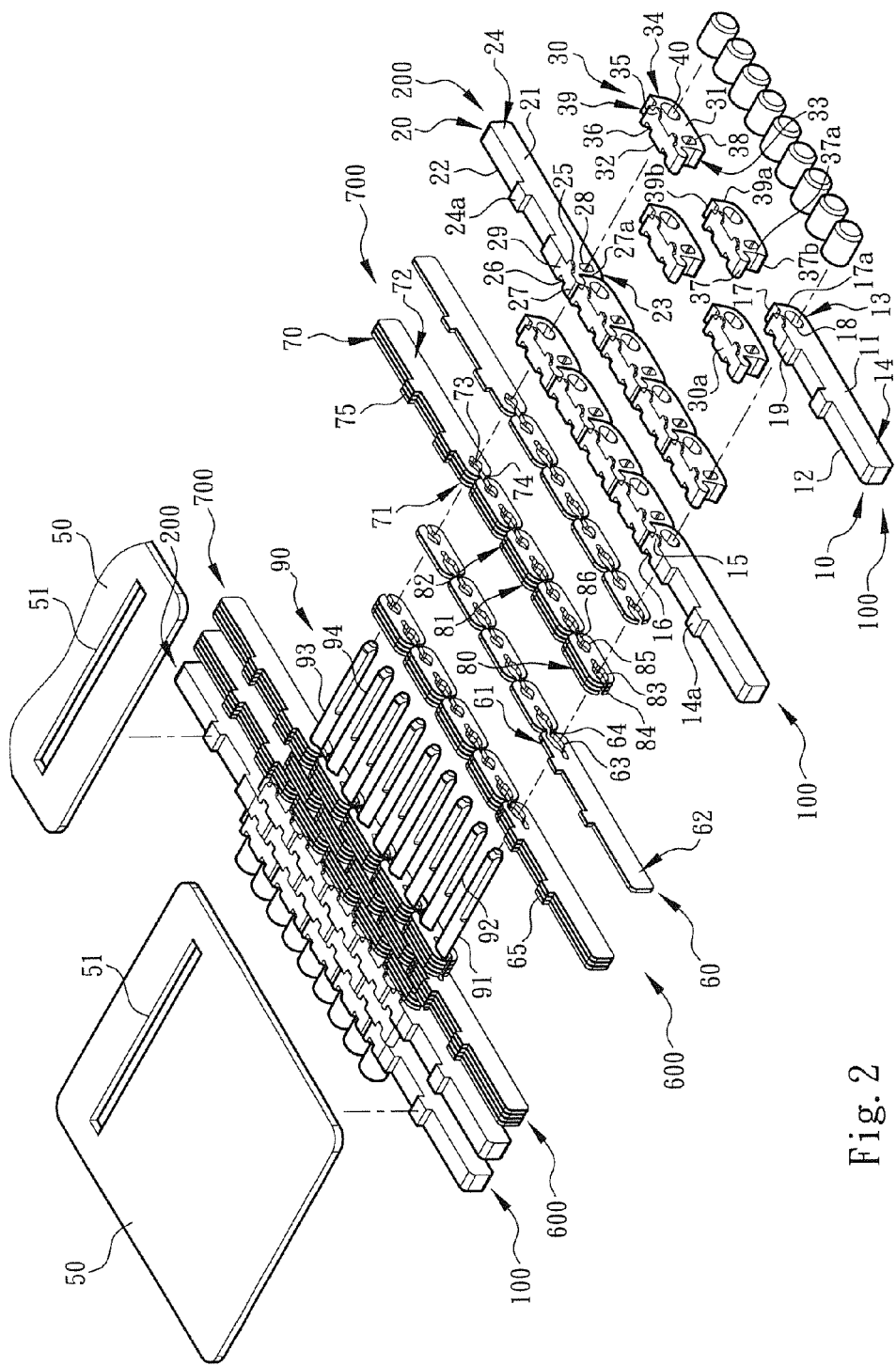
FIG. 2 is a perspective exploded view of the preferred embodiment of the hinge device of the present invention, showing the structures of the first joint unit, the subsidiary joint unit, the second joint unit and the torque mechanism of the hinge device.
Figure 3:
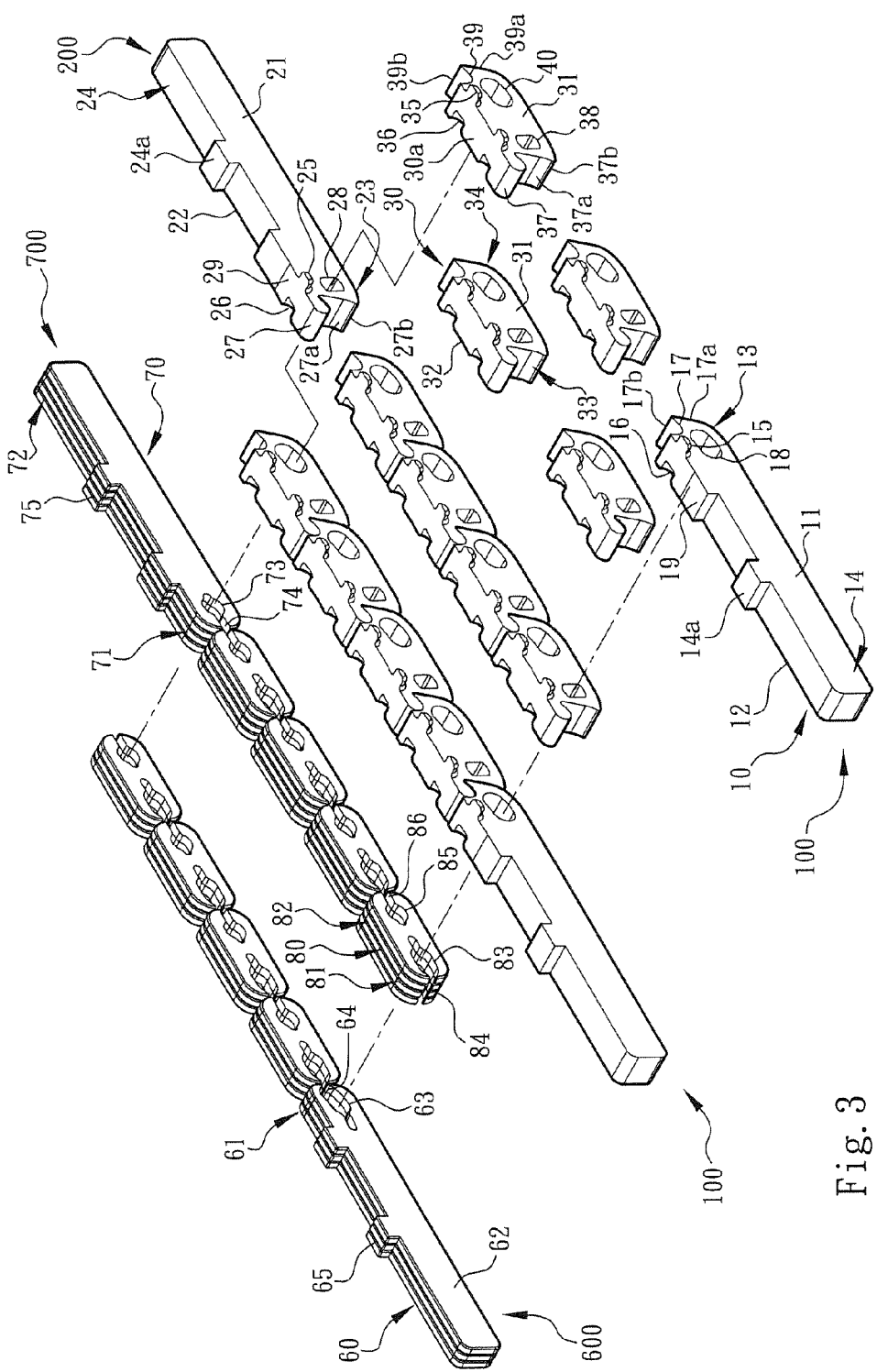
FIG. 3 is an enlarged view of a part of FIG. 2, showing the structures of the first joint unit, the subsidiary joint unit, the second joint unit and the torque mechanism of the hinge device.

Please refer to FIGS. 1, 2 and 3. The hinge device applicable to soft display module of the present invention includes an assembly of a joint unit assembly 100 or 200 and motional shafts 90. As shown in the drawings, the joint unit assembly has multiple adjacent plate bodies side by side combined with each other. The joint unit assembly is correspondingly assembled with multiple motional shafts 90 to form the hinge device. The joint unit assembly is defined with or has a main section (or referred to as middle section). The main section has two ends, a first side (11, 21 or 31), a second side (12, 22 or 32) and a top section (19, 29 or 30a) positioned on upper side of the main section. The hinge device can be assembled with a display module 800 in adaptation to the opening/closing operation of the display module 800. The display module 800 means a common rigid display screen or a flexible soft display screen. In a preferred embodiment of the present invention, a flexible soft display screen is taken as an example hereinafter for illustration purposes.

As shown in FIGS. 1, 2 and 3, the joint unit assembly includes a first joint unit 10, a second joint unit 20 and at least one subsidiary joint unit 30. Each of the first, second and subsidiary joint units 10, 20, 30 is defined with two sides and two ends. Two sides of the first and second joint units 10, 20 are respectively first sides 11, 21 and second sides 12, 22. Two ends of the first and second joint units 10, 20 are respectively pivotal ends 13, 23 and assembling ends 14, 24. A rotary shaft 15 perpendicularly protrudes from the top section 19 or an edge portion (near the pivotal end 13) of the first side 11 of the first joint unit 10. Another rotary shaft 25 perpendicularly protrudes from the top section 29 or an edge portion (near the pivotal end 23) of the first side 21 of the second joint unit 20. The top section 19 or an edge portion of the second side 12 of the first joint unit 10 is formed with a socket 16 corresponding to the rotary shaft 15. The top section 29 or an edge portion of the second side 22 of the second joint unit 20 is formed with a socket 26 corresponding to the rotary shaft 25.

As shown in the drawings, the pivotal end 13 of the first joint unit is formed with a recess 17, an (oblique) insertion face 17a connected with the recess 17 and a shaft guide section 18 (or referred to as shaft guide portion) disposed near the pivotal end 13. The shaft guide section 18 is positioned on the main section of the first joint unit 10 and has the form of an arched slot for pivotally connecting with the motional shaft 90. Therefore, a certain (interval) distance is defined between the shaft guide section 18, the motional shaft 90 and the rotary shaft 15. The top portion 19 of the pivotal end 13 of the first joint unit is formed with a plane. The pivotal end 23 of the second joint unit is formed with a projection 27, an (oblique) insertion face 27a connected with the protrusion 27 and a shaft fixing section 28 (or referred to as shaft fixing portion) disposed near the pivotal end 23. The shaft fixing section 28 is positioned on the main section of the second joint unit 20 and has the form of a shaft hole for pivotally connecting with the motional shaft 90, whereby the second joint unit 20 can be moved along with the motional shaft 90. Therefore, a certain distance is defined between the shaft fixing section 28, the motional shaft 90 and the rotary shaft 25. The top portion 29 of the pivotal end 23 of the second joint unit is formed with a plane. In addition, the assembling end 14 of the first joint unit is formed with a raised connection section 14a and the assembling end 24 of the second joint unit is formed with a raised connection section 24a. The connection sections 14a, 24a are connected with a slot 51 of a fixing section 50 for arranging and assembling with the display module 800.

In this embodiment, the subsidiary joint unit 30 is defined with a first side 31, a second side 32, a first end 33 and a second end 34. Each of the first and second ends 33, 34 of the subsidiary joint unit 30 is formed with a rotary shaft 35 perpendicularly protruding from the top section 30a or an edge portion of the first side 31 of the subsidiary joint unit 30 corresponding to the first and second joint units 10, 20. Each of the first and second ends 33, 34 of the subsidiary joint unit 30 is formed with a socket 36 on the top section 30a or an edge section of the second side 32 of the subsidiary joint unit 30 corresponding to the rotary shaft 35.

Figure 4:
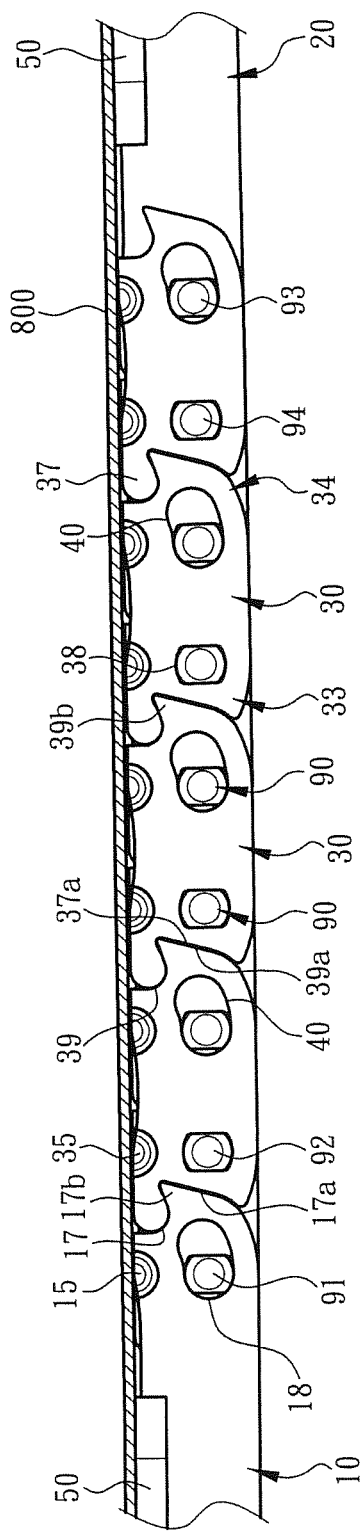
FIG. 4 is a plane view of the preferred embodiment of the hinge device of the present invention, showing that the soft display screen or display module is disposed on the hinge device in an opened state.

Please refer to FIGS. 2, 3 and 4. The first end 33 of the subsidiary joint unit is formed with a projection 37, an (oblique) insertion face 37a connected with the protrusion 37 and a shaft fixing section 38 (or referred to as shaft fixing portion) disposed near the first end 33. The shaft fixing section 38 is positioned on the main section of the subsidiary joint unit 30 and has the form of a shaft hole for pivotally connecting with the motional shaft 90, whereby the subsidiary joint unit 30 can be moved along with the motional shaft 90. Therefore, a certain distance is defined between the shaft fixing section 38, the motional shaft 90 and the rotary shaft 35. The second end 34 of the subsidiary joint unit is formed with a recess 39, an (oblique) insertion face 39a connected with the recess 39 and a shaft guide section 40 (or referred to as shaft guide portion) disposed near the second end 34. The shaft guide section 40 is positioned on the main section of the subsidiary joint unit 30 and has the form of an arched slot for pivotally connecting with the motional shaft 90. Therefore, a certain distance is defined between the shaft guide section 40, the motional shaft 90 and the rotary shaft 35. The top portion 30a of the subsidiary joint unit 30 is formed with a plane.

In this embodiment, the insertion face 17a of the first joint unit 10 and the insertion face 27a of the second joint unit 20 and the insertion face 37a of the first end 33 of the subsidiary joint unit are structurally complementary to each other. The insertion face 37a of the first end 33 of the subsidiary joint unit and the insertion face 39a of the second end 34 of the subsidiary joint unit are structurally complementary to each other. The insertion face 27a of the second joint unit 20 and the insertion face 39a of the second end 34 of the subsidiary joint unit are structurally complementary to each other.

The free ends of the insertion faces 17a, 27a, 37a, 39a are respectively formed with hook sections 17b, 27b, 37b, 39b. The hook sections 17b, 27b, 37b, 39b serve to enhance the connection stability of the insertion faces 17a, 27a, 37a, 39a and increase the slide frictional force of the insertion faces 17a, 27a, 37a, 39a.

FIGS. 2, 3 and 4 also show the structural cooperation between multiple motional shafts 90 and the joint units or hinge device assembled with the motional shafts 90. When the display module 800 is positioned in an opened position, the recess 17 and the insertion face 17a of the pivotal end 13 of the first joint unit are connected with the protrusion 37 and the insertion face 37a of the first end 33 of the subsidiary joint unit. The recess 39 and the insertion face 39a of the second end 34 of the subsidiary joint unit are connected with the protrusion 37 and the insertion face 37a of the first end 33 of another subsidiary joint unit, which is (leftward/rightward) adjacent to the subsidiary joint unit to form a first row of joint unit assembly 100. In addition, in a forward and backward side by side arrangement pattern, the protrusion 27 and the insertion face 27a of the pivotal end 23 of the second joint unit are connected with the recess 39 and the insertion face 39a of the second end 34 of the subsidiary joint unit 30. The protrusion 37 and the insertion face 37a of the first end 33 of the subsidiary joint unit are connected with the recess 39 and the insertion face 39a of the second end 34 of another subsidiary joint unit, which is (leftward/rightward) adjacent to the subsidiary joint unit to form a second row of joint unit assembly 200.

Accordingly, the shaft guide sections 18 of the pivotal ends 13 of the first joint units of the first row of joint unit assembly 100 are aligned with the shaft fixing sections 38 of the first ends 33 of the subsidiary joint units of the second row of joint unit assembly 200 and the first motional shafts 91 are pivotally connected and fitted through the shaft guide sections 18 and the shaft fixing sections 38. The shaft fixing sections 38 of the first ends 33 of the subsidiary joint units of the first row of joint unit assembly 100 are aligned with the shaft guide sections 40 of the second ends 34 of the subsidiary joint units of the second row of joint unit assembly 200 and the second motional shafts 92 are pivotally connected and fitted through the shaft fixing sections 38 and the shaft guide sections 40. In the same manner, the shaft fixing sections 28 of the pivotal ends 23 of the second joint units of the second row of joint unit assembly 200 are aligned with the shaft guide sections 40 of the second ends 34 of the (outermost) subsidiary joint units of the first row of joint unit assembly 100 and the third motional shafts 93 are pivotally connected and fitted through the shaft fixing sections 28 and the shaft guide sections 40. The shaft guide sections 40 of the second ends 34 of the subsidiary joint units of the second row of joint unit assembly 200 are aligned with the shaft fixing sections 38 of the first ends 33 of the subsidiary joint units of the first row of joint unit assembly 100 and the fourth motional shafts 94 are pivotally connected and fitted through the shaft guide sections 40 and the shaft fixing sections 38.

Also, the rotary shafts 15, 35 of the first row of joint unit assembly 100 are inserted into the sockets 26, 36 of the second row of joint unit assembly 200 to serve as rotational fulcrums (of the first row of joint unit assembly 100 and second row of joint unit assembly 200). The rotary shafts 25, 35 of the second row of joint unit assembly 200 are inserted into the sockets 16, 36 of another forward/backward adjacent first row of joint unit assembly 100 to serve as rotational fulcrums (of the first row of joint unit assembly 100 and second row of joint unit assembly 200).

When the motional shafts 90 move along with the display module 800 or the assembling end 14 of the first joint unit and the assembling end 24 of the second joint unit, the recesses 17, 39 and the insertion faces 17a, 39a will respectively move relative to the protrusions 37, 27 and the insertion faces 37a, 27a to establish a frictional torque mechanism and achieve a locating effect immediately after the operation force disappears.

In a preferred embodiment, the motional shafts 90 are assembled with a torque mechanism. The torque mechanism includes a first torque unit 60, a second torque unit 70 and at least one subsidiary torque unit 80 respectively corresponding to the first joint unit 10, the second joint unit 20 and the subsidiary joint unit 30. When the motional shafts 90 move, the torque mechanism frictionally interferes with the motional shafts 90 to create torque change or torque difference.

To speak more specifically, the first and second torque units 60, 70 are respectively defined with pivotal ends 61, 71 and assembling ends 62, 72. Each of the assembling ends 62, 72 is formed with a raised connection section 65, 75 connected with the slot 51 of the fixing section 50. The pivotal end 61 of the first torque unit is formed with a guide hole 63 with an opening 64 corresponding to the pivotal end 13 of the first joint unit. The first motional shaft 91 is pivotally connected and fitted through the guide hole 63. The pivotal end 71 of the second torque unit is formed with a shaft hole 73 with an opening 74 corresponding to the pivotal end 23 of the second joint unit. The third motional shaft 93 is pivotally connected and fitted through the shaft hole 73. The subsidiary torque unit 80 is defined with a first end 81 and a second end 82. The first end 81 is formed with a guide hole 83 with an opening 84. The second end 82 is formed with a shaft hole 85 with an opening 86.

As shown in the drawings, the guide hole 63 and the opening 64 of the pivotal end 61 of the first torque unit face the guide hole 83 and the opening 84 of the first end 81 of the subsidiary torque unit. The shaft hole 85 and the opening 86 of the second end 82 of the subsidiary torque unit face the guide hole 83 and the opening 84 of the first end 81 of another adjacent subsidiary torque unit to form a first row of torque unit assembly 600. The shaft hole 73 and the opening 74 of the pivotal end 71 of the second torque unit face the guide hole 85 and the opening 86 of the second end 82 of the subsidiary torque unit. The guide hole 83 and the opening 84 of the first end 81 of the subsidiary torque unit face the shaft hole 85 and the opening 86 of the second end 82 of another adjacent subsidiary torque unit to form a second row of torque unit assembly 700.

Accordingly, the guide hole 63 of the pivotal end 61 of the first torque unit is aligned with the guide hole 83 of the first end 81 of the (outermost) subsidiary torque unit of the second row of torque unit assembly 700, the shaft guide section 18 of the pivotal end 13 of the first joint unit and the shaft fixing section 38 of the first end 33 of the (outermost) subsidiary joint unit of the second row of joint unit assembly 200. The first motional shaft 91 is pivotally connected and fitted through the guide hole 63, the guide hole 83, the shaft guide section 18 and the shaft fixing section 38. The guide hole 83 of the first end 81 of the subsidiary torque unit of the first row of torque unit assembly 600 is aligned with the shaft hole 85 of the second end 82 of the (outermost) subsidiary torque unit of the second row of torque unit assembly 700, the shaft fixing section 38 of the first end 33 of the subsidiary joint unit of the first row of joint unit assembly 100 and the shaft guide section 40 of the second end 34 of the (outermost) subsidiary joint unit of the second row of joint unit assembly 200. The second motional shaft 92 is pivotally connected and fitted through the guide hole 83, the shaft hole 85, the shaft fixing section 38 and the shaft guide section 40.

Also, the shaft hole 85 of the second end 82 of the subsidiary torque unit of the (outermost) subsidiary torque unit of the first row of torque unit assembly 600 is aligned with the shaft hole 73 of the pivotal end 71 of the second torque unit, the shaft guide section 40 of the second end 34 of the subsidiary joint unit of the (outermost) subsidiary joint unit of the first row of joint unit assembly 100 and the shaft fixing section 28 of the pivotal end 23 of the second joint unit. The third motional shaft 93 is pivotally connected and fitted through the shaft hole 85, the shaft hole 73, the shaft guide section 40 and the shaft fixing section 28. The guide hole 83 of the first end 81 of the (outermost) subsidiary torque unit of the first row of torque unit assembly 600 is aligned with the shaft hole 85 of the second end 82 of the subsidiary torque unit of the second row of torque unit assembly 700, the shaft fixing section 38 of the first end 33 of the (outermost) subsidiary joint unit of the first row of joint unit assembly 100 and the shaft guide section 40 of the second end 34 of the subsidiary joint unit of the second row of joint unit assembly 200. The fourth motional shaft 94 is pivotally connected and fitted through the guide hole 83, the shaft hole 85, the shaft fixing section 38 and the shaft guide section 40.

It should be noted that the guide hole 63 and opening 64 of the pivotal end 61 of the first torque unit, the shaft hole 73 and opening 4 of the pivotal end 71 of the second torque unit, the guide hole 83 and opening 84 of the first end 81 of the subsidiary torque unit and the shaft hole 85 and opening 86 of the second end 82 of the subsidiary torque unit help in providing an elastic holding force (or torque) for the motional shaft 90 when the motional shaft 90 moves or rotates.

Please refer to FIG. 4, which shows the structural cooperation between the first joint unit 10, the second joint unit 20 and the subsidiary joint unit 30 when the display module 800 is positioned in an opened position. When opened, the motional shaft 90 (or the first motional shaft 91) is positioned in a position in the shaft guide section 18 of the first joint unit 10, which is defined as a first position, and the motional shaft 90 (or the third motional shaft 93) is positioned in a position in the shaft guide section 40 of the subsidiary joint unit, which is also defined as a first position. The other end of the shaft guide sections 18, 40 is defined as a second position opposite to the first position.

Figure 5:
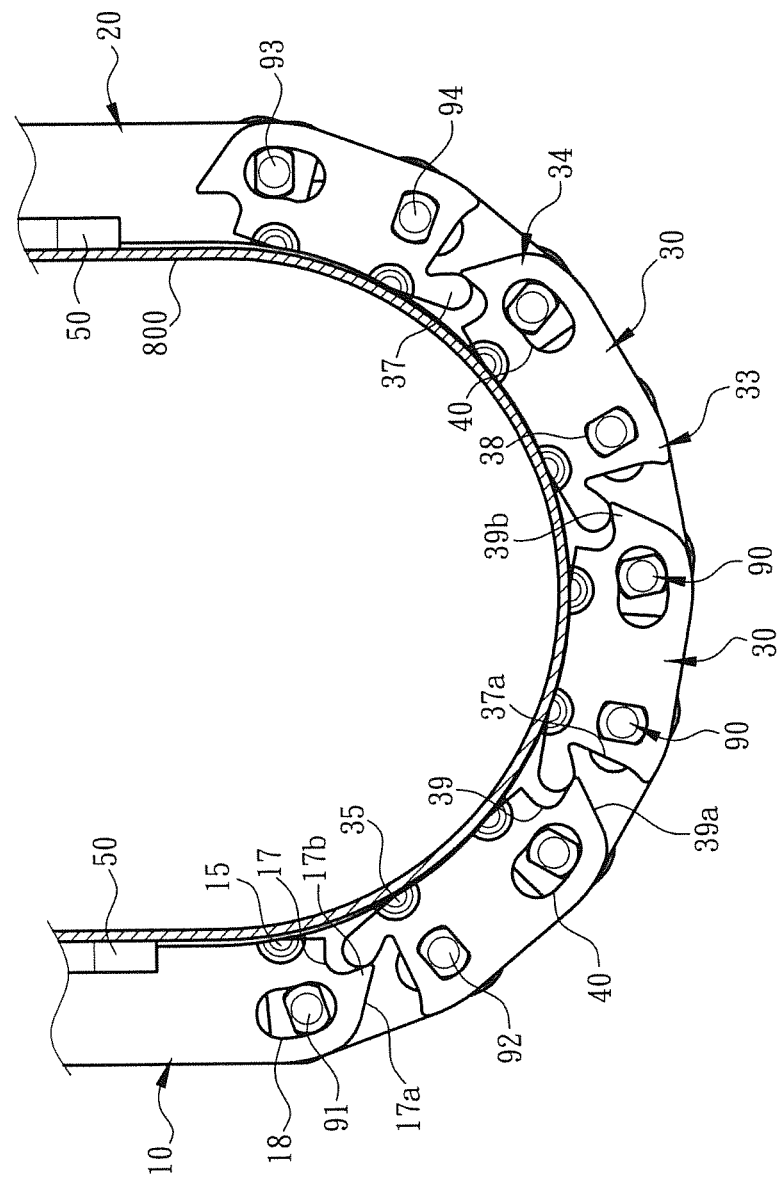
FIG. 5 is a plane view according to FIG. 4, showing that the soft display screen or display module is flexed into a closed state.

When an operator operates the display module 800 and flexes the display module 800 from the opened position of FIG. 4 to the closed position of FIG. 5, the fixing sections 50 drive the first joint units 10 and the second joint units 20 (and/or the first torque units 60 and the second torque units 70) to swing. At this time, the motional shafts 90 (such as the first and second motional shafts 91, 93) are forcedly rotated to drive all subsidiary joint units 30 and/or the subsidiary torque units 80 to swing. At the same time, the motional shafts 90 are moved from the first position in the shaft guide sections 18, 40 to the second position as shown in FIG. 5.

It should be noted that the hinge device is characterized in that:
1. Each of the top section 19 of the pivotal end 13 of the first joint unit, the top section 29 of the pivotal end 23 of the second joint unit and the top portion 30a of the subsidiary joint unit 30 is formed with a substantially plane structure.
2. The rotary shafts 15, 25, 35 and the sockets 16, 26, 36 are formed along the planes of the top sections 19, 29, 30a. After the first and second joint units 10, 20 are assembled with the display module 800, the display module 800 will attach to the top sections 19, 29, 30a and is positioned in a position as adjacent to the axes (or connection line of axes) of the rotary shafts 15, 25, 35 as possible or a position coinciding with the axes.
3. When the motional shafts 90 drive the first joint unit 10, the subsidiary joint unit 30 and the second joint unit 20 to swing and rotate, the rotary shafts 15, 25, 35 of the first joint unit 10, the subsidiary joint unit 30 and the second joint unit 20 are plugged in the sockets 16, 26, 36 as the rotational fulcrums. Such structure can truly improve or solve the problem that when the display module 800 is flexed and opened/closed, the display module is squeezed and crimped as shown in FIGS. 4 and 5.

In a modified embodiment, the first joint unit 10 is directly pivotally connected with the second joint unit 20 (the recess 17 and insertion face 17a of the first joint unit 10 are connected with the protrusion 27 and insertion face 27a of the second joint unit 20) and assembled with the motional shaft 90. The rotary shafts 15, 25 of the first and second joint units 10, 20 are plugged in other assembling parts of the electronic apparatus or the display module 800. Such arrangement can minimize the number of the components. In another modified embodiment, the first joint unit 10 is directly pivotally connected with the second joint unit 20 (the recess 17 and insertion face 17a of the first joint unit 10 are connected with the protrusion 27 and insertion face 27a of the second joint unit 20) and the rotary shafts 35 of the first and second ends 33, 34 of at least one subsidiary joint unit are respectively plugged in the sockets 16, 26 of the first and second joint units 10, 20 (or the rotary shafts 15, 25 of the first and second joint units 10, 20 are plugged in the sockets 36 of the first and second ends 33, 34 of the subsidiary joint unit) and assembled with the motional shafts 90. This arrangement can achieve the same effect.

In comparison with the conventional device, the hinge device applicable to soft display module of the present invention can be more easily operated and has the following advantages:

1. The hinge device and the relevant components have been redesigned. For example, each of the top sections 19, 29, 30a of the joint units (or the first joint unit 10, the second joint unit 20 and the subsidiary joint unit 30) is formed with a substantially plane structure. The rotary shafts 15, 25, 35 and the sockets 16, 26, 36 are formed along the planes of the top portions 19, 29, 30a. The joint units are formed with recesses 17, 39 and insertion faces 17a, 39a and/or hook sections 17b, 39b, and shaft guide sections 18, 40 for pivotally connecting with the motional shafts 90, and the protrusions 27, 37 and insertion faces 27a, 37a and/or hook sections 27b, 37b, and shaft fixing sections 28, 38 for pivotally connecting with the motional shafts 90. Accordingly, when the display module 800 is flexed and opened/closed, the motional shafts 90 are rotatably moved between the first and second positions of the shaft guide sections 18, 40 along with the opening/closing operation of the display module 800. This arrangement is obviously different from the conventional rotary shaft or pivot pin structure and power transmission form thereof.

2. The rotary shafts 15, 25, 35 of the joint units or the axes of the rotary shafts are as attached to the display module 800 as possible. This changes the use form and is different from the conventional device. In practice, the application range is also widened. The hinge device is applicable to both hard and soft display screens of electronic apparatuses. Especially, the hinge device improves or solves the aforesaid problem that when the soft display screen is flexed around the rotary shaft, the soft display screen will be squeezed and crimped and the soft display screen can be hardly truly located.

3. The joint units are formed with the recesses 17, 39, the protrusions 27, 37, the insertion faces 17a, 27a, 37a, 39a and/or hook sections 17b, 27b, 37b, 39b. When the joint units move along with the motional shafts 90, a frictional torque system is provided. In addition, a torque mechanism (first torque units 60, second torque units 70 and subsidiary torque units 80) is further provided. The first torque units 60, second torque units 70 and subsidiary torque units 80 are formed with guide holes 63, 83 with openings 64, 84 and shaft holes 73, 85 with openings 74, 86. When the motional shafts 90 are moved or rotated, the torque mechanism exerts an elastic holding force to the motional shafts 90 to enhance the locating or fixing effect of the hinge device in operation. Moreover, according to the specification, the number or torque of the joint units and/or torque mechanisms can be easily changed or adjusted to meet the pattern design requirement of lightweight and slim configuration of electronic apparatus.

In conclusion, the hinge device applicable to soft display module of the present invention is different from the conventional device in space form and is advantageous over the conventional device. The hinge device of the present invention is inventive and patentable.

The above embodiments are only used to illustrate the present invention, not intended to limit the scope thereof. Many modifications of the above embodiments can be made without departing from the spirit of the present invention.

What is claimed is:

1. A hinge device applicable to soft display module, comprising a joint unit assembly, the joint unit assembly having a main section, the main section having two ends, a first side, a second side and a top section positioned on upper side of the main section, the joint unit assembly having rotary shafts and motional shafts; the joint unit assembly has multiple shaft guide sections and shaft fixing sections positioned on the main section and respectively assembled with the motional shafts; the rotary shafts being positioned on the top section of the joint unit assembly, the motional shafts being positioned on the main section of the joint unit assembly; the joint unit assembly includes a first joint unit and a second joint unit; each of the first and second joint units having a pivotal end and an assembling end; the joint unit assembly further includes at least two subsidiary joint units; two ends of the subsidiary joint unit being a first end and a second end, the shaft fixing section being disposed at the first end of the subsidiary joint unit for pivotally connecting with the motional shaft; the shaft guide section being disposed at the second end of the subsidiary joint unit for pivotally connecting with the motional shaft, the joint unit assembly being movable with the rotary shafts serving as rotational fulcrums to drive the motional shafts to relatively displace and move within the main section of the joint unit assembly.

2. The hinge device applicable to soft display module as claimed in claim 1, wherein the rotary shaft and a corresponding socket being formed on the first and second sides of the joint unit assembly along the top section, a distance being defined between the rotary shaft, the motional shaft of the shaft guide section and the motional shaft of the shaft fixing section, the shaft guide section of the joint unit assembly being defined with a first position and a second position, the joint unit assembly being rotatable with the rotary shaft and the socket serving as rotational fulcrums, whereby the motional shafts are rotatably relatively movable between the first and second positions of the shaft guide section to flex and open/close the soft display module.

3. The hinge device applicable to soft display module as claimed in claim 2, wherein the shaft guide section is an arched slot structure, while the shaft fixing section is a shaft hole structure.

4. The hinge device applicable to soft display module as claimed in claim 2, wherein the pivotal end of the first joint unit being formed with a recess and an insertion face connected with the recess, the shaft guide section being disposed at the pivotal end of the first joint unit, the pivotal end of the second joint unit being formed with a protrusion and an insertion face connected with the protrusion, the shaft fixing section being disposed at the pivotal end of the second joint unit.

5. The hinge device applicable to soft display module as claimed in claim 1, wherein the soft display module is disposed on the top portion of the joint unit assembly.

6. The hinge device applicable to soft display module as claimed in claim 5, wherein the rotary shaft perpendicularly protrudes from the first side of the joint unit assembly along the top section, the top section of the joint unit assembly being a plane structure.

7. The hinge device applicable to soft display module as claimed in claim 5, wherein the pivotal end of the first joint unit being formed with a recess and an insertion face connected with the recess, the shaft guide section being disposed at the pivotal end of the first joint unit, the pivotal end of the second joint unit being formed with a protrusion and an insertion face connected with the protrusion, the shaft fixing section being disposed at the pivotal end of the second joint unit.

8. The hinge device applicable to soft display module as claimed in claim 5, wherein the motional shafts are assembled with a torque mechanism, the torque mechanism being formed with a guide hole with an opening and a shaft hole with an opening, the guide hole and shaft hole of the torque mechanism being pivotally connected with the motional shafts, whereby when the motional shafts move, the torque mechanism interferes with the motional shafts to create torque change.

9. The hinge device applicable to soft display module as claimed in claim 1, wherein the pivotal end of the first joint unit being formed with a recess and an insertion face connected with the recess, the shaft guide section being disposed at the pivotal end of the first joint unit, the pivotal end of the second joint unit being formed with a protrusion and an insertion face connected with the protrusion, the shaft fixing section being disposed at the pivotal end of the second joint unit.

10. The hinge device applicable to soft display module as claimed in claim 9, wherein the first side of the subsidiary joint unit being formed with a rotary shaft along the top section, the second side of the subsidiary joint unit being formed with a socket along the top section, the first end of the subsidiary joint unit being formed with a protrusion and an insertion face connected with the protrusion, the second end of the subsidiary joint unit being formed with a recess and an insertion face connected with the recess, a distance being defined between the rotary shaft of the subsidiary joint unit, the motional shaft of the shaft guide section of the subsidiary joint unit and the motional shaft of the shaft fixing section of the subsidiary joint unit, the rotary shafts of the first and second ends of the subsidiary joint unit being plugged in the sockets of the first and second joint units.

11. The hinge device applicable to soft display module as claimed in claim 10, wherein the insertion face of the first joint unit and the insertion face of the second joint unit and the insertion face of the first end of the subsidiary joint unit are structurally obliquely complementary to each other, the insertion face of the first end of the subsidiary joint unit and the insertion face of the second end of the subsidiary joint unit being structurally complementary to each other, the insertion face of the second joint unit and the insertion face of the second end of the subsidiary joint unit being structurally obliquely complementary to each other, a free end of each of the insertion face of the first joint unit, the insertion face of the second joint unit and the insertion faces of the subsidiary joint unit being formed with a hook section.

12. The hinge device applicable to soft display module as claimed in claim 11, wherein the recess and the insertion face of the pivotal end of the first joint unit are connected with the protrusion and the insertion face of the first end of the subsidiary joint unit, the recess and the insertion face of the second end of the subsidiary joint unit being connected with the protrusion and the insertion face of the first end of another leftward/rightward adjacent subsidiary joint unit to form a first row of joint unit assembly, in a forward and backward side by side arrangement pattern, the protrusion and the insertion face of the pivotal end of the second joint unit being connected with the recess and the insertion face of the second end of the subsidiary joint unit, the protrusion and the insertion face of the first end of the subsidiary joint unit being connected with the recess and the insertion face of the second end of another leftward/rightward adjacent subsidiary joint unit to form a second row of joint unit assembly, the shaft guide sections of the pivotal end of the first joint unit of the first row of joint unit assembly being aligned with the shaft fixing section of the first end of the subsidiary joint unit of the second row of joint unit assembly, the first motional shaft being pivotally connected with the shaft guide section and the shaft fixing section, the shaft fixing section of the first end of the subsidiary joint unit of the first row of joint unit assembly being aligned with the shaft guide section of the second end of the subsidiary joint unit of the second row of joint unit assembly, the second motional shaft being pivotally connected with the shaft fixing section and the shaft guide section, in the same one by one arrangement manner, the shaft fixing section of the pivotal end of the second joint unit of the second row of joint unit assembly being aligned with the shaft guide section of the second end of the outermost subsidiary joint unit of the first row of joint unit assembly, the third motional shaft being pivotally connected with the shaft fixing section and the shaft guide section, the shaft guide section of the second end of the subsidiary joint unit of the second row of joint unit assembly being aligned with the shaft fixing section of the first end of the subsidiary joint units of the first row of joint unit assembly, the fourth motional shaft being pivotally connected with the shaft guide section and the shaft fixing section, the rotary shaft of the first row of joint unit assembly being inserted into the socket of the second row of joint unit assembly to serve as a rotational fulcrum of the first row of joint unit assembly and the second row of joint unit assembly, the rotary shaft of the second row of joint unit assembly being inserted into the socket of another forward/backward adjacent first row of joint unit assembly to serve as a rotational fulcrum of the first row of joint unit assembly and the second row of joint unit assembly, the assembling end of the first joint unit being formed with a raised connection section and the assembling end of the second joint unit being formed with a raised connection section, the connection sections being assembled with a slot of a fixing section.

13. The hinge device applicable to soft display module as claimed in claim 12, wherein the motional shafts are assembled with a torque mechanism, the torque mechanism including a first torque unit, a second torque unit and at least one subsidiary torque unit, the first and second torque units being respectively defined with pivotal ends and assembling ends, the pivotal end of the first torque unit being formed with a guide hole with an opening corresponding to the pivotal end of the first joint unit for pivotally connecting with the first motional shaft, the pivotal end of the second torque unit being formed with a shaft hole with an opening corresponding to the pivotal end of the second joint unit for pivotally connecting with the third motional shaft, the subsidiary torque unit having a first end and a second end, the first end being formed with a guide hole with an opening, the second end being formed with a shaft hole with an opening, the guide hole and the opening of the pivotal end of the first torque unit facing the guide hole and the opening of the first end of the subsidiary torque unit, the shaft hole and the opening of the second end of the subsidiary torque unit facing the guide hole and the opening of the first end of another adjacent subsidiary torque unit to form a first row of torque unit assembly, the guide hole and the opening of the pivotal end of the second torque unit facing the shaft hole and the opening of the second end of the subsidiary torque unit, the guide hole and the opening of the first end of the subsidiary torque unit facing the shaft hole and the opening of the second end of another adjacent subsidiary torque unit to form a second row of torque unit assembly, the guide hole of the pivotal end of the first torque unit being aligned with the guide hole of the first end of the outermost subsidiary torque unit of the second row of torque unit assembly, the shaft guide section of the pivotal end of the first joint unit and the shaft fixing section of the first end of the outermost subsidiary joint unit of the second row of joint unit assembly for pivotally connecting with the first motional shaft, the guide hole of the first end of the subsidiary torque unit of the first row of torque unit assembly being aligned with the shaft hole of the second end of the outermost subsidiary torque unit of the second row of torque unit assembly, the shaft fixing section of the first end of the subsidiary joint unit of the first row of joint unit assembly and the shaft guide section of the second end of the outermost subsidiary joint unit of the second row of joint unit assembly for pivotally connecting with the second motional shaft, the shaft hole of the second end of the subsidiary torque unit of the outermost subsidiary torque unit of the first row of torque unit assembly being aligned with the shaft hole of the pivotal end of the second torque unit, the shaft guide section of the second end of the subsidiary joint unit of the outermost subsidiary joint unit of the first row of joint unit assembly and the shaft fixing section of the pivotal end of the second joint unit for pivotally connecting with the third motional shaft, the guide hole of the first end of the outermost subsidiary torque unit of the first row of torque unit assembly being aligned with the shaft hole of the second end of the subsidiary torque unit of the second row of torque unit assembly, the shaft fixing section of the first end of the outermost subsidiary joint unit of the first row of joint unit assembly and the shaft guide section of the second end of the subsidiary joint unit of the second row of joint unit assembly for pivotally connecting with the fourth motional shaft, each of the assembling ends of the first and second torque units being formed with a raised connection section connected with the slot of the fixing section.

14. The hinge device applicable to soft display module as claimed in claim 10, wherein the recess and the insertion face of the pivotal end of the first joint unit are connected with the protrusion and the insertion face of the first end of the subsidiary joint unit, the recess and the insertion face of the second end of the subsidiary joint unit being connected with the protrusion and the insertion face of the first end of another leftward/rightward adjacent subsidiary joint unit to form a first row of joint unit assembly, in a forward and backward side by side arrangement pattern, the protrusion and the insertion face of the pivotal end of the second joint unit being connected with the recess and the insertion face of the second end of the subsidiary joint unit, the protrusion and the insertion face of the first end of the subsidiary joint unit being connected with the recess and the insertion face of the second end of another leftward/rightward adjacent subsidiary joint unit to form a second row of joint unit assembly, the shaft guide sections of the pivotal end of the first joint unit of the first row of joint unit assembly being aligned with the shaft fixing section of the first end of the subsidiary joint unit of the second row of joint unit assembly, the first motional shaft being pivotally connected with the shaft guide section and the shaft fixing section, the shaft fixing section of the first end of the subsidiary joint unit of the first row of joint unit assembly being aligned with the shaft guide section of the second end of the subsidiary joint unit of the second row of joint unit assembly, the second motional shaft being pivotally connected with the shaft fixing section and the shaft guide section, in the same one by one arrangement manner, the shaft fixing section of the pivotal end of the second joint unit of the second row of joint unit assembly being aligned with the shaft guide section of the second end of the outermost subsidiary joint unit of the first row of joint unit assembly, the third motional shaft being pivotally connected with the shaft fixing section and the shaft guide section, the shaft guide section of the second end of the subsidiary joint unit of the second row of joint unit assembly being aligned with the shaft fixing section of the first end of the subsidiary joint units of the first row of joint unit assembly, the fourth motional shaft being pivotally connected with the shaft guide section and the shaft fixing section, the rotary shaft of the first row of joint unit assembly being inserted into the socket of the second row of joint unit assembly to serve as a rotational fulcrum of the first row of joint unit assembly and the second row of joint unit assembly, the rotary shaft of the second row of joint unit assembly being inserted into the socket of another forward/backward adjacent first row of joint unit assembly to serve as a rotational fulcrum of the first row of joint unit assembly and the second row of joint unit assembly, the assembling end of the first joint unit being formed with a raised connection section and the assembling end of the second joint unit being formed with a raised connection section, the connection sections being assembled with a slot of a fixing section.

15. The hinge device applicable to soft display module as claimed in claim 14, wherein the motional shafts are assembled with a torque mechanism, the torque mechanism including a first torque unit, a second torque unit and at least one subsidiary torque unit, the first and second torque units being respectively defined with pivotal ends and assembling ends, the pivotal end of the first torque unit being formed with a guide hole with an opening corresponding to the pivotal end of the first joint unit for pivotally connecting with the first motional shaft, the pivotal end of the second torque unit being formed with a shaft hole with an opening corresponding to the pivotal end of the second joint unit for pivotally connecting with the third motional shaft, the subsidiary torque unit having a first end and a second end, the first end being formed with a guide hole with an opening, the second end being formed with a shaft hole with an opening, the guide hole and the opening of the pivotal end of the first torque unit facing the guide hole and the opening of the first end of the subsidiary torque unit, the shaft hole and the opening of the second end of the subsidiary torque unit facing the guide hole and the opening of the first end of another adjacent subsidiary torque unit to form a first row of torque unit assembly, the guide hole and the opening of the pivotal end of the second torque unit facing the shaft hole and the opening of the second end of the subsidiary torque unit, the guide hole and the opening of the first end of the subsidiary torque unit facing the shaft hole and the opening of the second end of another adjacent subsidiary torque unit to form a second row of torque unit assembly, the guide hole of the pivotal end of the first torque unit being aligned with the guide hole of the first end of the outermost subsidiary torque unit of the second row of torque unit assembly, the shaft guide section of the pivotal end of the first joint unit and the shaft fixing section of the first end of the outermost subsidiary joint unit of the second row of joint unit assembly for pivotally connecting with the first motional shaft, the guide hole of the first end of the subsidiary torque unit of the first row of torque unit assembly being aligned with the shaft hole of the second end of the outermost subsidiary torque unit of the second row of torque unit assembly, the shaft fixing section of the first end of the subsidiary joint unit of the first row of joint unit assembly and the shaft guide section of the second end of the outermost subsidiary joint unit of the second row of joint unit assembly for pivotally connecting with the second motional shaft, the shaft hole of the second end of the subsidiary torque unit of the outermost subsidiary torque unit of the first row of torque unit assembly being aligned with the shaft hole of the pivotal end of the second torque unit, the shaft guide section of the second end of the subsidiary joint unit of the outermost subsidiary joint unit of the first row of joint unit assembly and the shaft fixing section of the pivotal end of the second joint unit for pivotally connecting with the third motional shaft, the guide hole of the first end of the outermost subsidiary torque unit of the first row of torque unit assembly being aligned with the shaft hole of the second end of the subsidiary torque unit of the second row of torque unit assembly, the shaft fixing section of the first end of the outermost subsidiary joint unit of the first row of joint unit assembly and the shaft guide section of the second end of the subsidiary joint unit of the second row of joint unit assembly for pivotally connecting with the fourth motional shaft, each of the assembling ends of the first and second torque units being formed with a raised connection section connected with the slot of the fixing section.

16. The hinge device applicable to soft display module as claimed in claim 10, wherein the motional shafts are assembled with a torque mechanism, the torque mechanism including a first torque unit, a second torque unit and at least one subsidiary torque unit, the first and second torque units being respectively defined with pivotal ends and assembling ends, the pivotal end of the first torque unit being formed with a guide hole with an opening corresponding to the pivotal end of the first joint unit, the pivotal end of the second torque unit being formed with a shaft hole with an opening corresponding to the pivotal end of the second joint unit, the subsidiary torque unit having a first end and a second end, the first end being formed with a guide hole with an opening, the second end being formed with a shaft hole with an opening, the motional shafts being respectively pivotally connected with the guide holes and shaft holes of the torque mechanism, whereby when the motional shafts move, the torque mechanism interferes with the motional shafts to create torque change.

17. The hinge device applicable to soft display module as claimed in claim 9, wherein the first side of the subsidiary joint unit being formed with a rotary shaft along the top section, the second side of the subsidiary joint unit being formed with a socket along the top section, the first end of the subsidiary joint unit being formed with a protrusion and an insertion face connected with the protrusion, the second end of the subsidiary joint unit being formed with a recess and an insertion face connected with the recess, a distance being defined between the rotary shaft of the subsidiary joint unit, the motional shaft of the shaft guide section of the subsidiary joint unit and the motional shaft of the shaft fixing section of the subsidiary joint unit, the rotary shafts of the first and second joint units being plugged in the sockets of the first and second ends of the subsidiary joint unit.

18. The hinge device applicable to soft display module as claimed in claim 17, wherein the insertion face of the first joint unit and the insertion face of the second joint unit and the insertion face of the first end of the subsidiary joint unit are structurally obliquely complementary to each other, the insertion face of the first end of the subsidiary joint unit and the insertion face of the second end of the subsidiary joint unit being structurally complementary to each other, the insertion face of the second joint unit and the insertion face of the second end of the subsidiary joint unit being structurally obliquely complementary to each other, a free end of each of the insertion face of the first joint unit, the insertion face of the second joint unit and the insertion faces of the subsidiary joint unit being formed with a hook section.

19. The hinge device applicable to soft display module as claimed in claim 18, wherein the recess and the insertion face of the pivotal end of the first joint unit are connected with the protrusion and the insertion face of the first end of the subsidiary joint unit, the recess and the insertion face of the second end of the subsidiary joint unit being connected with the protrusion and the insertion face of the first end of another leftward/rightward adjacent subsidiary joint unit to form a first row of joint unit assembly, in a forward and backward side by side arrangement pattern, the protrusion and the insertion face of the pivotal end of the second joint unit being connected with the recess and the insertion face of the second end of the subsidiary joint unit, the protrusion and the insertion face of the first end of the subsidiary joint unit being connected with the recess and the insertion face of the second end of another leftward/rightward adjacent subsidiary joint unit to form a second row of joint unit assembly, the shaft guide sections of the pivotal end of the first joint unit of the first row of joint unit assembly being aligned with the shaft fixing section of the first end of the subsidiary joint unit of the second row of joint unit assembly, the first motional shaft being pivotally connected with the shaft guide section and the shaft fixing section, the shaft fixing section of the first end of the subsidiary joint unit of the first row of joint unit assembly being aligned with the shaft guide section of the second end of the subsidiary joint unit of the second row of joint unit assembly, the second motional shaft being pivotally connected with the shaft fixing section and the shaft guide section, in the same one by one arrangement manner, the shaft fixing section of the pivotal end of the second joint unit of the second row of joint unit assembly being aligned with the shaft guide section of the second end of the outermost subsidiary joint unit of the first row of joint unit assembly, the third motional shaft being pivotally connected with the shaft fixing section and the shaft guide section, the shaft guide section of the second end of the subsidiary joint unit of the second row of joint unit assembly being aligned with the shaft fixing section of the first end of the subsidiary joint units of the first row of joint unit assembly, the fourth motional shaft being pivotally connected with the shaft guide section and the shaft fixing section, the rotary shaft of the first row of joint unit assembly being inserted into the socket of the second row of joint unit assembly to serve as a rotational fulcrum of the first row of joint unit assembly and the second row of joint unit assembly, the rotary shaft of the second row of joint unit assembly being inserted into the socket of another forward/backward adjacent first row of joint unit assembly to serve as a rotational fulcrum of the first row of joint unit assembly and the second row of joint unit assembly, the assembling end of the first joint unit being formed with a raised connection section and the assembling end of the second joint unit being formed with a raised connection section, the connection sections being assembled with a slot of a fixing section.

20. The hinge device applicable to soft display module as claimed in claim 19, wherein the motional shafts are assembled with a torque mechanism, the torque mechanism including a first torque unit, a second torque unit and at least one subsidiary torque unit, the first and second torque units being respectively defined with pivotal ends and assembling ends, the pivotal end of the first torque unit being formed with a guide hole with an opening corresponding to the pivotal end of the first joint unit for pivotally connecting with the first motional shaft, the pivotal end of the second torque unit being formed with a shaft hole with an opening corresponding to the pivotal end of the second joint unit for pivotally connecting with the third motional shaft, the subsidiary torque unit having a first end and a second end, the first end being formed with a guide hole with an opening, the second end being formed with a shaft hole with an opening, the guide hole and the opening of the pivotal end of the first torque unit facing the guide hole and the opening of the first end of the subsidiary torque unit, the shaft hole and the opening of the second end of the subsidiary torque unit facing the guide hole and the opening of the first end of another adjacent subsidiary torque unit to form a first row of torque unit assembly, the guide hole and the opening of the pivotal end of the second torque unit facing the shaft hole and the opening of the second end of the subsidiary torque unit, the guide hole and the opening of the first end of the subsidiary torque unit facing the shaft hole and the opening of the second end of another adjacent subsidiary torque unit to form a second row of torque unit assembly, the guide hole of the pivotal end of the first torque unit being aligned with the guide hole of the first end of the outermost subsidiary torque unit of the second row of torque unit assembly, the shaft guide section of the pivotal end of the first joint unit and the shaft fixing section of the first end of the outermost subsidiary joint unit of the second row of joint unit assembly for pivotally connecting with the first motional shaft, the guide hole of the first end of the subsidiary torque unit of the first row of torque unit assembly being aligned with the shaft hole of the second end of the outermost subsidiary torque unit of the second row of torque unit assembly, the shaft fixing section of the first end of the subsidiary joint unit of the first row of joint unit assembly and the shaft guide section of the second end of the outermost subsidiary joint unit of the second row of joint unit assembly for pivotally connecting with the second motional shaft, the shaft hole of the second end of the subsidiary torque unit of the outermost subsidiary torque unit of the first row of torque unit assembly being aligned with the shaft hole of the pivotal end of the second torque unit, the shaft guide section of the second end of the subsidiary joint unit of the outermost subsidiary joint unit of the first row of joint unit assembly and the shaft fixing section of the pivotal end of the second joint unit for pivotally connecting with the third motional shaft, the guide hole of the first end of the outermost subsidiary torque unit of the first row of torque unit assembly being aligned with the shaft hole of the second end of the subsidiary torque unit of the second row of torque unit assembly, the shaft fixing section of the first end of the outermost subsidiary joint unit of the first row of joint unit assembly and the shaft guide section of the second end of the subsidiary joint unit of the second row of joint unit assembly for pivotally connecting with the fourth motional shaft, each of the assembling ends of the first and second torque units being formed with a raised connection section connected with the slot of the fixing section.

21. The hinge device applicable to soft display module as claimed in claim 17, wherein the recess and the insertion face of the pivotal end of the first joint unit are connected with the protrusion and the insertion face of the first end of the subsidiary joint unit, the recess and the insertion face of the second end of the subsidiary joint unit being connected with the protrusion and the insertion face of the first end of another leftward/rightward adjacent subsidiary joint unit to form a first row of joint unit assembly, in a forward and backward side by side arrangement pattern, the protrusion and the insertion face of the pivotal end of the second joint unit being connected with the recess and the insertion face of the second end of the subsidiary joint unit, the protrusion and the insertion face of the first end of the subsidiary joint unit being connected with the recess and the insertion face of the second end of another leftward/rightward adjacent subsidiary joint unit to form a second row of joint unit assembly, the shaft guide sections of the pivotal end of the first joint unit of the first row of joint unit assembly being aligned with the shaft fixing section of the first end of the subsidiary joint unit of the second row of joint unit assembly, the first motional shaft being pivotally connected with the shaft guide section and the shaft fixing section, the shaft fixing section of the first end of the subsidiary joint unit of the first row of joint unit assembly being aligned with the shaft guide section of the second end of the subsidiary joint unit of the second row of joint unit assembly, the second motional shaft being pivotally connected with the shaft fixing section and the shaft guide section, in the same one by one arrangement manner, the shaft fixing section of the pivotal end of the second joint unit of the second row of joint unit assembly being aligned with the shaft guide section of the second end of the outermost subsidiary joint unit of the first row of joint unit assembly, the third motional shaft being pivotally connected with the shaft fixing section and the shaft guide section, the shaft guide section of the second end of the subsidiary joint unit of the second row of joint unit assembly being aligned with the shaft fixing section of the first end of the subsidiary joint units of the first row of joint unit assembly, the fourth motional shaft being pivotally connected with the shaft guide section and the shaft fixing section, the rotary shaft of the first row of joint unit assembly being inserted into the socket of the second row of joint unit assembly to serve as a rotational fulcrum of the first row of joint unit assembly and the second row of joint unit assembly, the rotary shaft of the second row of joint unit assembly being inserted into the socket of another forward/backward adjacent first row of joint unit assembly to serve as a rotational fulcrum of the first row of joint unit assembly and the second row of joint unit assembly, the assembling end of the first joint unit being formed with a raised connection section and the assembling end of the second joint unit being formed with a raised connection section, the connection sections being assembled with a slot of a fixing section.

22. The hinge device applicable to soft display module as claimed in claim 21, wherein the motional shafts are assembled with a torque mechanism, the torque mechanism including a first torque unit, a second torque unit and at least one subsidiary torque unit, the first and second torque units being respectively defined with pivotal ends and assembling ends, the pivotal end of the first torque unit being formed with a guide hole with an opening corresponding to the pivotal end of the first joint unit for pivotally connecting with the first motional shaft, the pivotal end of the second torque unit being formed with a shaft hole with an opening corresponding to the pivotal end of the second joint unit for pivotally connecting with the third motional shaft, the subsidiary torque unit having a first end and a second end, the first end being formed with a guide hole with an opening, the second end being formed with a shaft hole with an opening, the guide hole and the opening of the pivotal end of the first torque unit facing the guide hole and the opening of the first end of the subsidiary torque unit, the shaft hole and the opening of the second end of the subsidiary torque unit facing the guide hole and the opening of the first end of another adjacent subsidiary torque unit to form a first row of torque unit assembly, the guide hole and the opening of the pivotal end of the second torque unit facing the shaft hole and the opening of the second end of the subsidiary torque unit, the guide hole and the opening of the first end of the subsidiary torque unit facing the shaft hole and the opening of the second end of another adjacent subsidiary torque unit to form a second row of torque unit assembly, the guide hole of the pivotal end of the first torque unit being aligned with the guide hole of the first end of the outermost subsidiary torque unit of the second row of torque unit assembly, the shaft guide section of the pivotal end of the first joint unit and the shaft fixing section of the first end of the outermost subsidiary joint unit of the second row of joint unit assembly for pivotally connecting with the first motional shaft, the guide hole of the first end of the subsidiary torque unit of the first row of torque unit assembly being aligned with the shaft hole of the second end of the outermost subsidiary torque unit of the second row of torque unit assembly, the shaft fixing section of the first end of the subsidiary joint unit of the first row of joint unit assembly and the shaft guide section of the second end of the outermost subsidiary joint unit of the second row of joint unit assembly for pivotally connecting with the second motional shaft, the shaft hole of the second end of the subsidiary torque unit of the outermost subsidiary torque unit of the first row of torque unit assembly being aligned with the shaft hole of the pivotal end of the second torque unit, the shaft guide section of the second end of the subsidiary joint unit of the outermost subsidiary joint unit of the first row of joint unit assembly and the shaft fixing section of the pivotal end of the second joint unit for pivotally connecting with the third motional shaft, the guide hole of the first end of the outermost subsidiary torque unit of the first row of torque unit assembly being aligned with the shaft hole of the second end of the subsidiary torque unit of the second row of torque unit assembly, the shaft fixing section of the first end of the outermost subsidiary joint unit of the first row of joint unit assembly and the shaft guide section of the second end of the subsidiary joint unit of the second row of joint unit assembly for pivotally connecting with the fourth motional shaft, each of the assembling ends of the first and second torque units being formed with a raised connection section connected with the slot of the fixing section.

23. The hinge device applicable to soft display module as claimed in claim 9, wherein the rotary shaft perpendicularly protrudes from the first side of the joint unit assembly along the top section, the top section of the joint unit assembly being a plane structure.

24. The hinge device applicable to soft display module as claimed in claim 9, wherein the insertion face of the first joint unit and the insertion face of the second joint unit are structurally obliquely complementary to each other, a free end of each of the insertion face of the first joint unit and the insertion face of the second joint unit being formed with a hook section.

25. The hinge device applicable to soft display module as claimed in claim 9, wherein the motional shafts are assembled with a torque mechanism, the torque mechanism including a first torque unit and a second torque unit respectively corresponding to the first joint unit and the second joint unit, the first and second torque units being respectively defined with pivotal ends and assembling ends, the pivotal end of the first torque unit being formed with a guide hole with an opening corresponding to the pivotal end of the first joint unit, the pivotal end of the second torque unit being formed with a shaft hole with an opening corresponding to the pivotal end of the second joint unit, the motional shafts being respectively pivotally connected with the guide holes and shaft holes of the torque mechanism, whereby when the motional shafts move, the torque mechanism interferes with the motional shafts to create torque change, each of the assembling ends of the first and second torque units being formed with a raised connection section connected with the slot of the fixing section.

26. The hinge device applicable to soft display module as claimed in claim 1, wherein the rotary shaft perpendicularly protrudes from the first side of the joint unit assembly along the top section, the top section of the joint unit assembly being a plane structure.

27. The hinge device applicable to soft display module as claimed in claim 1, wherein the motional shafts are assembled with a torque mechanism, the torque mechanism being formed with a guide hole with an opening and a shaft hole with an opening, the guide hole and shaft hole of the torque mechanism being pivotally connected with the motional shafts, whereby when the motional shafts move, the torque mechanism interferes with the motional shafts to create torque change.

* * * * *